(12) United States Patent
Freijy et al.

(10) Patent No.: US 6,698,829 B1
(45) Date of Patent: Mar. 2, 2004

(54) VEHICLE SEAT ASSEMBLY HAVING MOVABLE PANELS MOUNTED THEREON

(75) Inventors: Nizar Freijy, Lake Orion, MI (US); Robert John Dowell, Rochester, MI (US); Paul Cameron Babcock, Bloomfield Hills, MI (US); Dennis John Varga, Waterford, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/262,634

(22) Filed: Oct. 1, 2002

(51) Int. Cl.⁷ .................................................. A47C 7/62
(52) U.S. Cl. ............. 297/188.09; 297/331; 297/378.11; 297/188.11; 296/65
(58) Field of Search ................................ 297/331, 335, 297/336, 378.11, 378.12, 378.13, 378.14, 248, 233, 232, 188.11, 188.13, 188.09, 188.08

(56) References Cited

U.S. PATENT DOCUMENTS 2,926,948 A    3/1960   Koplin et al.
2,926,951 A    3/1960   Koplin (List continued on next page.)

FOREIGN PATENT DOCUMENTS

| DE | 27 52 431 | 5/1979 |
|----|-----------|--------|
| EP | 0 030 924 | 6/1981 |
| EP | 0 151 426 | 8/1985 |
| EP | 0 749 864 | 12/1996 |
| WO | 96/38318 | 12/1996 |
| WO | 97/41001 | 11/1997 |

*Primary Examiner*—Peter M. Cuomo
*Assistant Examiner*—Erika Garrett
(74) *Attorney, Agent, or Firm*—Bill C. Panagos

(57) ABSTRACT

A seat assembly for mounting on a vehicle floor includes a seat bottom and at least one panel movably attached to the seat bottom. The panel is movable between a storage position adjacent the seat bottom, and a deployed position extending outwardly from the seat bottom such that the panel is in a generally horizontal position to form a flat load floor above the vehicle floor.

19 Claims, 3 Drawing Sheets

U.S. PATENT DOCUMENTS

| | | | |
|---|---|---|---|
| 3,506,984 A | 4/1970 | Ellis et al. | |
| 3,822,911 A | 7/1974 | Radke et al. | |
| 4,008,919 A | 2/1977 | Muraishi | |
| 4,273,376 A * | 6/1981 | Duguet et al. | 296/65.09 |
| 4,341,418 A * | 7/1982 | Chappell | 297/144 |
| 4,364,602 A * | 12/1982 | Rigazio | 297/334 |
| 4,382,629 A | 5/1983 | Froumajou | |
| 4,443,034 A | 4/1984 | Beggs | |
| 4,699,418 A * | 10/1987 | Plavetich | 296/65.09 |
| 4,700,989 A | 10/1987 | Ercilla | |
| 4,805,953 A | 2/1989 | Yamauchi | |
| 4,869,541 A * | 9/1989 | Wainwright | 296/65.09 |
| 4,888,854 A | 12/1989 | Russell et al. | |
| 4,957,321 A | 9/1990 | Martin et al. | |
| 4,979,772 A | 12/1990 | Carey et al. | |
| 5,038,437 A | 8/1991 | Russell et al. | |
| 5,133,589 A | 7/1992 | Kimura | |
| 5,195,795 A | 3/1993 | Cannera et al. | |
| 5,251,956 A * | 10/1993 | Hofmeyer | 297/173 |
| 5,322,335 A | 6/1994 | Niemi | |
| 5,482,349 A | 1/1996 | Richter et al. | |
| 5,547,242 A | 8/1996 | Dukaatz et al. | |
| 5,558,386 A | 9/1996 | Tilly et al. | |
| 5,570,931 A | 11/1996 | Kargillis et al. | |
| 5,582,453 A | 12/1996 | Leuchtmann et al. | |
| 5,597,199 A * | 1/1997 | Hoffman et al. | 297/144 |
| 5,662,367 A | 9/1997 | Rastetter et al. | |
| 5,662,377 A | 9/1997 | Holdampf | |
| 5,716,091 A | 2/1998 | Wieczorek | |
| 5,795,023 A * | 8/1998 | Kayumi | 297/331 |
| 5,871,255 A * | 2/1999 | Harland et al. | 297/257 |
| 6,000,742 A * | 12/1999 | Schaefer et al. | 296/65.09 |
| 6,123,380 A | 9/2000 | Sturt et al. | |
| 6,129,404 A | 10/2000 | Mattarella et al. | |
| 6,135,549 A * | 10/2000 | Demick et al. | 297/188.1 |
| 6,217,096 B1 | 4/2001 | Koiwa et al. | |
| 6,293,603 B1 | 9/2001 | Waku et al. | |
| 6,318,784 B2 | 11/2001 | Nishide | |
| 6,431,645 B2 * | 8/2002 | Massara et al. | 297/144 |
| 6,435,609 B1 * | 8/2002 | Gasser | 297/188.1 |

* cited by examiner

VEHICLE SEAT ASSEMBLY HAVING MOVABLE PANELS MOUNTED THEREON

BACKGROUND OF THE INVENTION

This invention relates in general to vehicle seats, and in particular to a seat assembly having movable panels for creating a horizontal load floor.

Larger passenger vehicles, such as sport utility vehicles and vans, typically include a relatively flat load floor at the rear of the vehicle which is accessible through a rear lift gate or door. The load floor is generally the upper surface of the floor of the vehicle. Typically, the floor of the vehicle is stepped downward in front of the load floor to create a secondary floor which is lower than the load floor. A second row of seats is commonly mounted on this secondary floor.

It is known to provide a second row seat which is movable to a forward position to expand the rear cargo area of the vehicle. The second row seat includes a seat back pivotally mounted on a seat bottom. The seat back is movable to a collapsed position wherein the seat back is rotated forward until the front surface of the seat back rests on the upper surface of the seat bottom. The seat bottom is pivotally mounted on the floor about a pivot generally located at the front lower portion of the seat bottom. After collapsing of the seat back, the seat bottom and the seat back are rotated as a single unit about the pivot about 90 degrees to a forward position. In the forward position, the seat back and the seat bottom are generally in a vertically oriented position. This orientation provides accessibility to the floor which was directly underneath the seat bottom when in its seating position. Although the movement of the second row seat is generally desirable to expand the rear cargo area, the stepped configuration of the secondary floor and the rear load floor is sometimes problematic when loading and unloading cargo thereon.

BRIEF SUMMARY OF THE INVENTION

This invention relates to a vehicle seat assembly having structures to form a generally flat horizontal load floor preferably co-planar with a rear cargo floor of the vehicle. The seat assembly includes a seat bottom and at least one panel movably attached to the seat bottom. The panel is movable between a storage position adjacent the seat bottom, and a deployed position extending outwardly from the seat bottom such that the panel is in a generally horizontal position to form a flat load floor above the vehicle floor.

Various objects and advantages of this invention will become apparent to those skilled in the art from the following detailed description of the preferred embodiment, when read in light of the accompanying drawings.

DETAILED DESCRIPTION OF THE INVENTION

Figure 1:
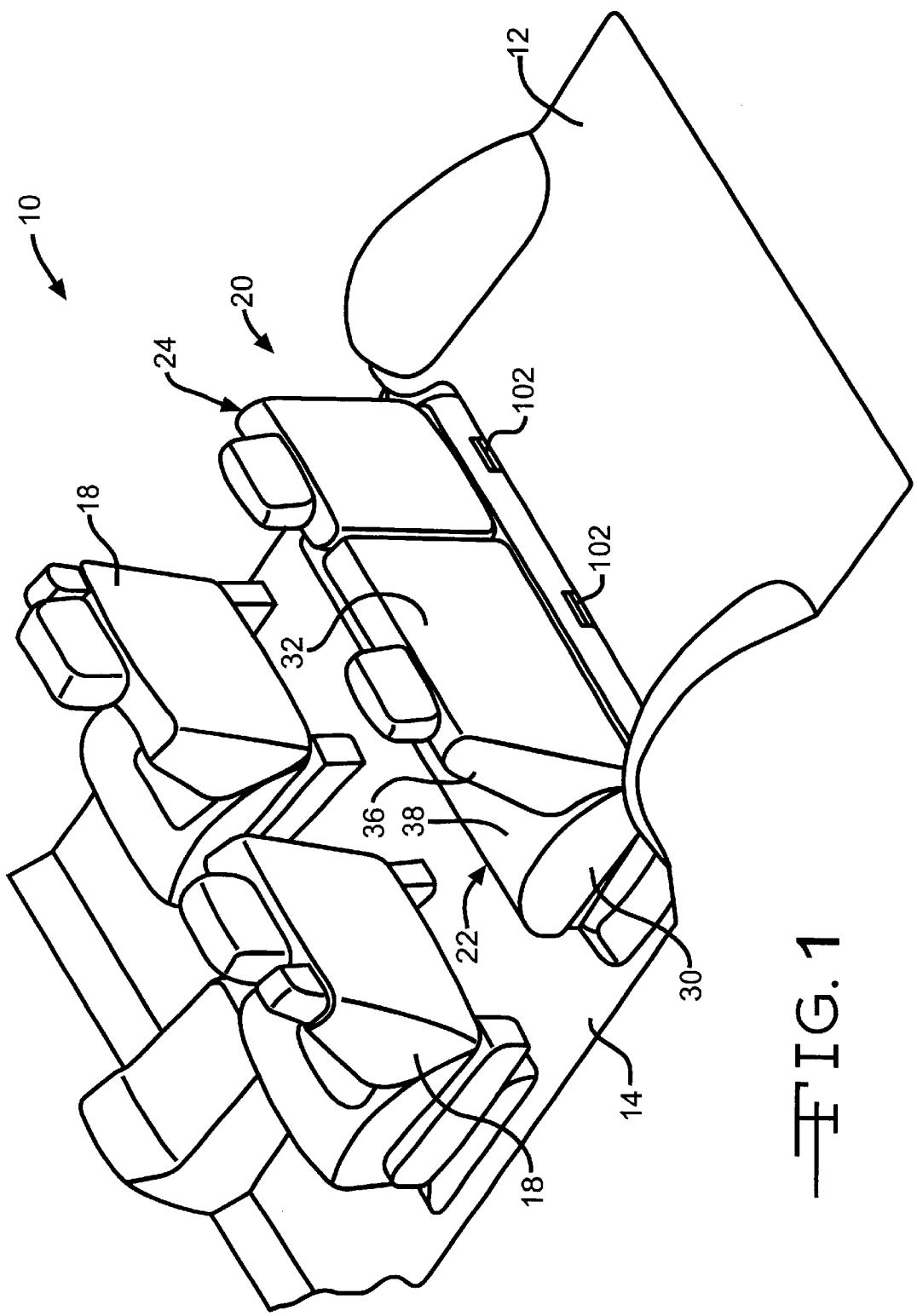
FIG. 1 is a perspective view of a portion of a vehicle interior including a second row seat assembly, in accordance with the present invention, wherein the seat assembly is shown in its seating position.
Figure 2:
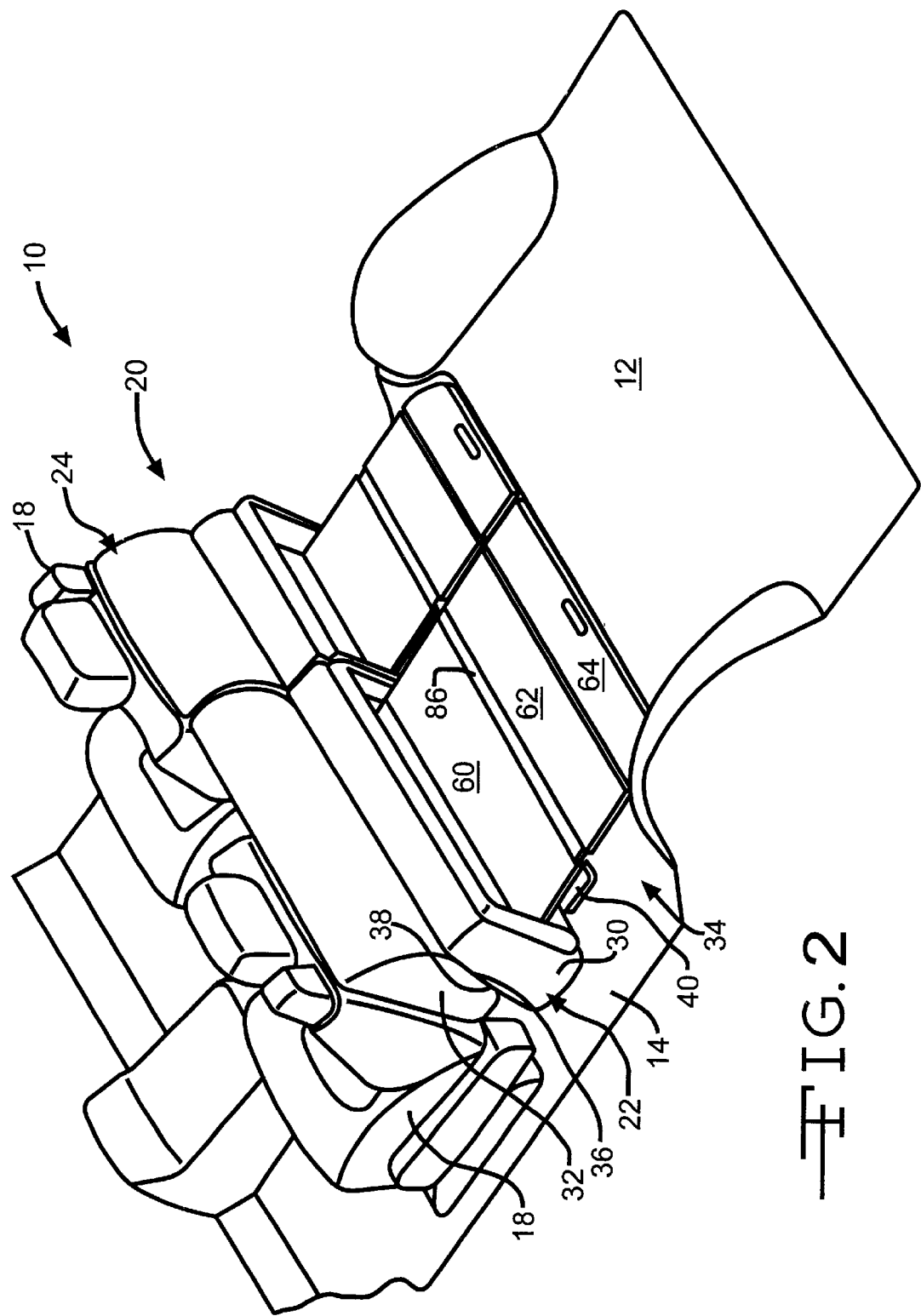
FIG. 2 is a perspective view of the vehicle interior of FIG. 1, wherein the seat of the seat assembly is shown in its forward position, and the panel assembly is shown in its deployed position.
Figure 3:
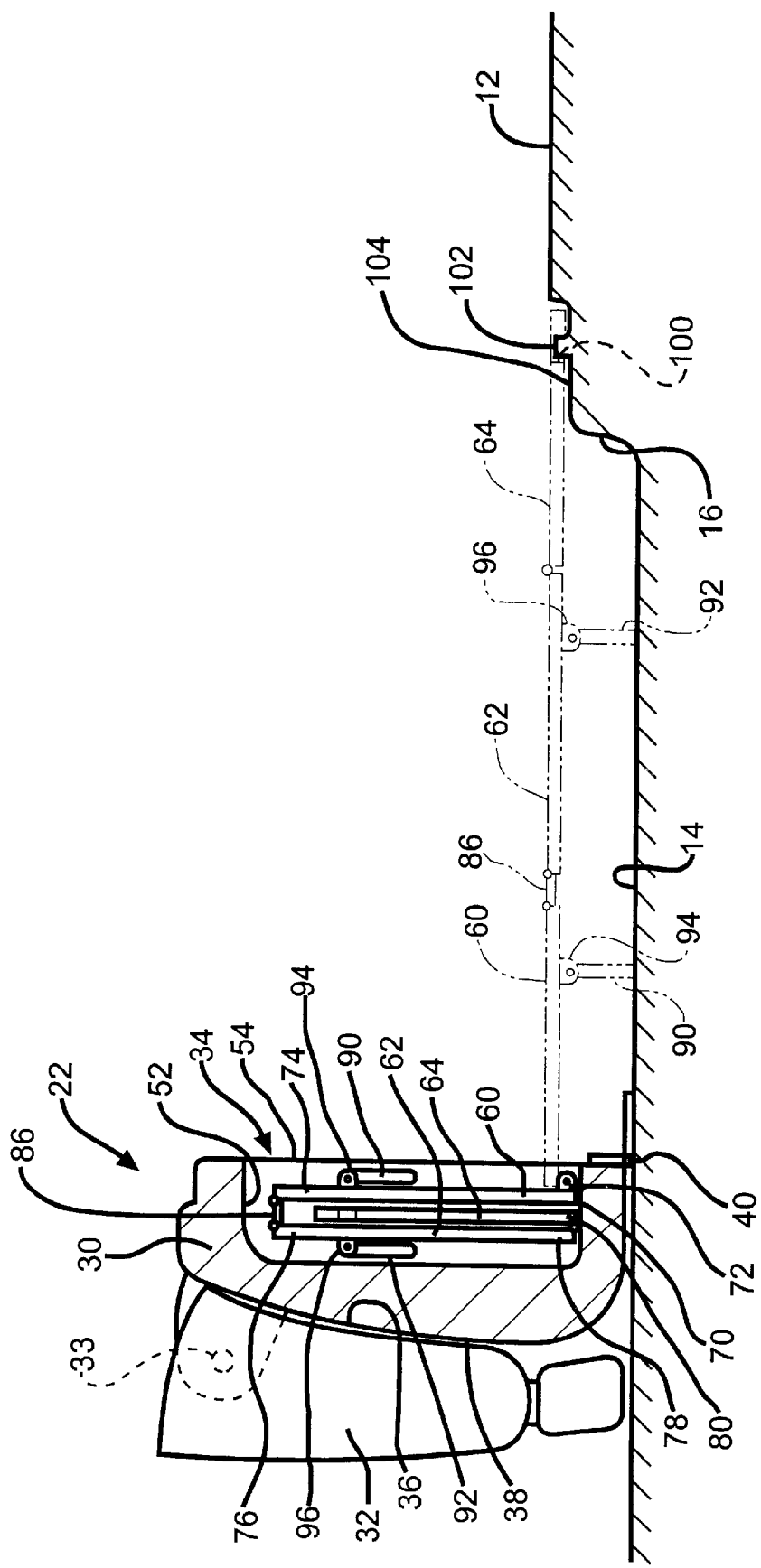
FIG. 3 is a partial cross-sectional side view of the seat assembly of FIG. 1 shown in its forward position, and wherein the panel assembly is represented in its deployed position by broken lines.

Referring now to the drawings, there is illustrated in FIGS. 1 through 3, a portion of a vehicle interior, indicated generally at 10. The interior 10 includes a stepped floor defining a rear load floor 12 and a forward floor 14 separated by a shoulder 16. As is typical with many vehicle floors, the forward floor 14 is lower than the rear load floor 12. The interior further includes a pair of front seats 18 mounted on the forward floor 14. Although not shown, the forward floor 14 could also be stepped defining yet another forward floor upon which the front seats 18 are mounted.

The interior 10 further includes a second row of seats, generally indicated at 20. Preferably, the second row of seats 20 are wide enough to accommodate three occupants. Although the second row of seats 20 could be a single bench type seat extending across the lateral width of the interior, preferably the second row of seats 20 is defined as two separate seats 22 and 24 which are independently movable relative to one another. The inboard sides of the seats 22 and 24 are preferably adjacent one another in their seating positions to simulate a single bench-type seat. The seats 22 and 24 could have the same dimensional width or may have different widths, as shown in FIGS. 1 and 2. For example, the seat 22 could be dimensioned to have a width of about 60 percent the total width of the second row of seats 20, and the seat 24 could have a width of about 40 percent of the total width of the second row of seats 20. This is commonly referred to in the industry as a 60/40 slit seat arrangement and provides the ability to have the seat 24 remain in its seating position for a single occupant while the other seat 22 is moved to a forward position, as shown in FIG. 2 to substantially increase or extend the rear cargo area. Except for the width of the seats 22 and 24, they are essentially similar in function and structure and, therefore, only the seat 22 will be described in detail. If desired any of the seats 18, 22, and 24 may be provided with a conventional seat track mechanism for adjusting the fore and aft position of the seat relative to the vehicle floor.

The seat 22 generally includes a seat bottom 30, a seat back 32, and a panel assembly 34 mounted in the seat bottom 30. The seat bottom 30 and the seat back 32 are shown in a seating position in FIG. 1, for supporting an occupant. The seat back 32 is pivotally mounted on the seat bottom 30 such that the seat back 32 is pivotable about an internal pivot 33 to a collapsed position on top of the seat bottom 30. In the collapsed position, a front seating surface 36 of the seat back 32 is positioned adjacent an upper seating surface 38 of the seat bottom 30.

The seat bottom 30 is preferably pivotally mounted on the floor 14, such as by a hinge 40 defining a first pivot. More preferably, the first pivot is located at a lower front portion of the seat bottom 30. Once the seat back 32 is moved to its collapsed position on top of the seat bottom 34, the combination of the seat bottom 30 and seat back 32 are pivotable to a forward position, as shown in FIGS. 2 and 3. In their forward positions, the seat bottom 30 and the seat back 32 are generally in a vertically oriented position such that seat back 32 is in front of the seat bottom 30. The seat back 32 and the seat bottom 30 can be moved to their forward positions by manually moving them about the first pivot or by an actuation of an electrical mechanism (not shown). Alternatively, the seat bottom 30 could include a spring (not shown) for biasing the seat bottom 30 to its forward position. In this configuration, a latch (not shown) would releasably retain the seat bottom 30 in its seating position. Upon release of the latch, the spring would force the seat bottom 30 to move to its forward position. A spring and latch mechanism (not shown) may also by provided on the seat back 32 to automatically move the seat back 32 to its collapsed position upon actuation of the latch.

The seat 22, as well as the seat 24, further includes a panel assembly, indicated generally at 34. The panel assembly 34 is preferably at least partially disposed within a recess 52 formed in a lower surface 54 of the seat bottom 30. The recess 52 may be formed within the seat bottom 30 or a separate panel housing (not shown) defining the recess 52 which is attached to the bottom portion of the seat bottom 30.

The panel assembly 34 generally includes a front panel 60, an intermediate panel 62, and an extension panel 64. The panels 60, 62, and 64 are preferably relatively flat rectangular shaped panels and can be made of any suitable material, such as plastic. The front panel 60 includes a first end 70 which is pivotally connected to the seat bottom 30 at a second pivot 72. The front panel 60 has a second end 74 which is pivotally connected to a first end 76 of the intermediate panel 62. The intermediate panel 62 has a second end 78 which is pivotally connected to a first end 80 of the extension panel 64. As shown in FIG. 3, the panels 60, 62, and 64 are pivotable to a stacked generally parallel relationship within the recess 52, defined as in a storage position, such that the extension panel 64 is positioned between the front panel 60 and the intermediate panel 62. Because of the extension panel 64 being positioned between the front panel 60 and the intermediate panel 62, the front panel 60 and the intermediate panel 62 can be pivotally connected by a relatively thin hinge panel 86 to accommodate the thickness of the extension panel 64. Of course, the hinge panel 86 is not required and the front panel 60 and/or the intermediate panel 62 may be formed with indentations to accommodate the thickness of the extension panel. The hinge panel 86 may be a rigid panel or somewhat flexible, such as made out of a fabric. The pivotal connections between the panels 60, 62, and 64 can be formed by any suitable structure, such as for example, a mechanical hinge, an integrally formed living hinge, or a flexible material.

As shown by broken lines in FIG. 3, the panels 60, 62, and 64 are pivotable to a deployed position such that the panels are in a generally horizontal position. Preferably, the panels 60, 62, and 64 are co-planar with one another. More preferably, the configuration of the panel assembly 34 and the location of second pivot 72 are such that the panels 60, 62, and 64 are also co-planar with the rear load floor 12. The panels 60, 62, and 64 and the rear load floor 12 form a continuous relatively flat load floor for the ease of loading and unloading cargo thereon.

Since the panels 60, 62, and 64 are positioned at a spaced apart relationship above the forward floor 14, one or more of the panels 60, 62, and 64 preferably includes supports or legs 90 and 92 for supporting the panels 60, 62, and 64. The legs 90 and 92 can be positioned at any suitable location on the panels 60, 62, and 64. Preferably, the legs 90 and 92 are pivotally mounted on the respective panel by brackets 94 and 96, respectively, so that the legs 90 and 92 can be moved to a collapsed position against the panels for storage within the recess 52, as shown in FIG. 3. The legs 90 and 92 can have any suitable shape which structurally supports the panels 60, 62, and 64, as well as the cargo placed thereon. The legs 90 and 92 may also be spring biased so that they are automatically biased to their extending position, as indicated by the broken lines in FIG. 3, when the panels 60, 62, and 64 are moved to their deployed position. A coil spring (not shown) housed in the brackets 94 and 96 could be incorporated to provide the spring biasing. Alternatively, other mechanisms, such as a cable and pulley system or a linkage assembly (not shown) may be used to move the legs 90 and 92 to their extended or retracted positions automatically when the panels 60, 62, and 64 are moved.

To help retain the panels 60, 62, and 64 in their deployed positions and prevent them from sagging from a weight load placed thereon, it is desirable to releasably attach the extension panel 64 to a portion of the floor. For example, the extension panel 64 could include one or more apertures 100 for receiving upwardly extending ridges 102 formed or attached to the floor 12. The floor 12 also preferably includes a depression 104 formed therein for receiving the end of the extension panel 64 to accommodate the thickness of the panel 63 to provide a flat upper load floor surface.

It should be understood that while the embodiment of the panel assembly 34 includes three panels 60, 62, and 64, the seat 22 can include a single panel movably attached thereto which is movable to a generally horizontal position. Also, the panel or panels may by movably mounted on the seat bottom 30 by means other than a pivot. For example, the panels could be mounted in a sliding configuration by a pin and track assembly. The panels may also be simply positioned underneath the seat bottom 30 instead of disposed within the recess 52. In another embodiment, the panels could move between a storage and deployed position from a rear portion of the seat bottom 30 instead of from the lower surface, such that the seat bottom 30 need not move to a forward position.

In accordance with the provisions of the patent statutes, the principle and mode of operation of this invention have been explained and illustrated in its preferred embodiment. However, it must be understood that this invention may be practiced otherwise than as specifically explained and illustrated without departing is from its spirit or scope.

What is claimed is:

1. A seat assembly for mounting on a vehicle floor comprising:
    a seat bottom; and
    at least one panel movably attached to said seat bottom, said panel movable between a storage position adjacent said seat bottom, and a deployed position extending outwardly from said seat bottom;
    wherein said seat bottom is movably mounted relative to the vehicle floor between a seating position for supporting an occupant, and a forward position exposing said lower surface, such that a rear portion of said seat bottom is generally oriented vertically above a front portion of said seat bottom when said seat bottom is in said forward position; and
    wherein said panel is pivotally mounted on said seat bottom and movable between said storage position, wherein said panel is underneath said lower surface of said seat bottom when said seat bottom is in said seating position, and said deployed position, wherein said panel extends outwardly from said lower surface of said seat bottom and at a position lower than said rear portion of said seat bottom, such that said panel is in a generally horizontal position to form a flat load floor above a vehicle floor.

2. The seat assembly of claim 1, wherein said seat bottom defines a lower surface, and wherein said panel is underneath said lower surface when in said storage position.

3. The seat assembly of claim 2, wherein said panel is in a generally horizontal position underneath said seat bottom when in said storage position.

4. The seat assembly of claim 1, wherein said seat bottom is adapted to be pivoted relative to the vehicle floor at a front lower portion of said seat bottom.

5. The seat assembly of claim 1, wherein said panel is pivotally mounted on said seat bottom.

6. The seat assembly of claim 1, wherein said panel defines a first panel and said seat assembly further including a second panel pivotally attached to said first panel, said second panel movable between a storage position adjacent said seat bottom, and a deployed position extending outwardly from said first panel.

7. The seat assembly of claim 6, wherein said second panel is in a generally horizontal position when in said deployed position co-planar with said first panel in said deployed position to form a flat load floor above the vehicle floor.

8. The seat assembly of claim 1, wherein said seat bottom defines a lower portion having a recess formed therein, and wherein said panel is disposed in said recess when in said storage position.

9. The seat assembly of claim 8, wherein said panel is in a generally horizontal position within said recess when said panel is in said storage position.

10. The seat assembly of claim 8, wherein said panel defines a first panel and said seat assembly further includes a second panel pivotally attached to said first panel, said second panel movable between a storage position disposed in said recess, and a deployed position extending outwardly from said first panel.

11. The seat assembly of claim 10, wherein said second panel is in a generally horizontal position when in said deployed position co-planar with said first panel to form a flat load floor above the vehicle floor.

12. The seat assembly of claim 10, wherein said second panel is disposed in said recess when said first panel is in said storage position.

13. The seat assembly of claim 1, further including at least one leg attached to said panel for supporting said panel on the vehicle floor when said panel is in said deployed position.

14. The seat assembly of claim 13, wherein said leg is pivotally attached to said panel such that said leg is movable between a retracted position adjacent said panel when said panel is in said storage position, and an extended position for supporting said panel on the vehicle floor when said panel is in said deployed position.

15. The seat assembly of claim 14, wherein said leg is spring biased to said extended position.

16. An apparatus comprising:
 a floor having an upper portion and a lower portion;
 a seat bottom defining a lower surface and adapted to be pivoted relative to said floor at a front lower portion of said seat bottom, said seat bottom being movably mounted relative to said lower portion of said floor between a seating position for supporting an occupant, and a forward position exposing said lower surface; and
 at least one panel pivotally mounted on said seat bottom and movable between a storage position, wherein said panel is underneath said lower surface of said seat bottom when said seat bottom is in said seating position, and a deployed position, wherein said panel extends outwardly from said lower surface of said seat bottom such that said panel is in a generally horizontal position and is generally coplanar with said upper portion of said floor to form a flat load floor above said floor.

17. The apparatus of claim 16, wherein said panel is in a generally horizontal position underneath said seat bottom when in said storage position.

18. The apparatus of claim 16, wherein said panel defines a first panel and said seat assembly further including a second panel pivotally attached to said first panel, said second panel movable between a storage position disposed in said recess, and a deployed position extending outwardly from said first panel.

19. The apparatus of claim 16, further including at least one leg attached to said panel for supporting said panel on said floor when said panel is in said deployed position.

\* \* \* \* \*